United States Patent
Yang et al.

(10) Patent No.: US 10,187,796 B2
(45) Date of Patent: Jan. 22, 2019

(54) AUTHENTICATION AND ASSOCIATION METHOD AND SYSTEM

(71) Applicant: HUAWEI TECHNOLOGIES CO., LTD., Shenzhen (CN)

(72) Inventors: Xun Yang, Beijing (CN); Yuan Tao, Shenzhen (CN); Mu Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 263 days.

(21) Appl. No.: 15/205,333

(22) Filed: Jul. 8, 2016

(65) Prior Publication Data

US 2016/0323744 A1  Nov. 3, 2016

Related U.S. Application Data

(63) Continuation of application No. PCT/CN2014/070326, filed on Jan. 8, 2014.

(51) Int. Cl.
*H04W 12/06* (2009.01)

(52) U.S. Cl.
CPC ............................. *H04W 12/06* (2013.01)

(58) Field of Classification Search
CPC .................................................. H04W 12/06
USPC ............................................................ 726/3
See application file for complete search history.

(56) References Cited

U.S. PATENT DOCUMENTS

2009/0093249 A1*  4/2009  Zhu ................... H04W 8/06
455/433

FOREIGN PATENT DOCUMENTS

| CN | 101013940 A | 8/2007 |
|----|-------------|--------|
| CN | 101018174 A | 8/2007 |
| CN | 101111056 A | 1/2008 |
| CN | 101114957 A | 1/2008 |
| CN | 101155092 A | 4/2008 |

OTHER PUBLICATIONS

International Search Report dated Nov. 27, 2014 in corresponding International Application No. PCT/CN2014/070326.
International Search Report dated Nov. 27, 2014 in corresponding International Patent Application No. PCT/CN2014/070326.

(Continued)

*Primary Examiner* — Jacob Lipman
(74) *Attorney, Agent, or Firm* — Staas & Halsey LLP

(57) ABSTRACT

This application discloses an authentication and association method and system. An access point AP receives an authentication request sent by a station STA that needs to establish a connection to a service device; the AP establishes authentication with the STA; after the STA sends an association request to the service device, the AP receives an authentication result query request sent by the service device, and sends a result of the authentication result query request to the service device, so that the service device determines whether to establish an association with the STA; if the result shows that the STA is authenticated by the AP, the service device can establish an association with the STA; or if the result shows that the STA fails to be authenticated by the AP, the STA cannot establish an association with the service device.

8 Claims, 11 Drawing Sheets

(56) References Cited

OTHER PUBLICATIONS

"IEEE Standard for Information technology—Telecommunications and information exchange between systems Local and metropolitan area networks—Specific requirements Part 11: Wireless LAN Medium Access Control (MAC) and Physical Layer (PHY) Specifications", IEEE Standards Association, IEEE Std 802.11™-2012, Mar. 2012, NY, USA, (total 2793 pages, pages Index-2695) Filed electronically in multiple parts: Part 1 Index-pp. 1-157, Part 2 pp. 158-412, Part 3 pp. 413-667, Part 4 pp. 668-922, Part 5 pp. 923-1177, Part 6 pp. 1178-1432, Part 7 pp. 1433-1687, Part 8 pp. 1688-1942, Part 9 pp. 1943-2197, Part 10 pp. 2198-2452, Part 11 pp. 2453-2695.
Chinese Office Action dated Aug. 3, 2018 in related Chinese Patent Application No. 201480068887.6 (5 pages).

\* cited by examiner

AUTHENTICATION AND ASSOCIATION METHOD AND SYSTEM

CROSS-REFERENCE TO RELATED APPLICATIONS

This application is a continuation of International Patent Application No. PCT/CN2014/070326, filed on Jan. 8, 2014, which is hereby incorporated by reference in its entirety.

TECHNICAL FIELD

This application relates to the communications field, and in particular, to an authentication and association method and system.

BACKGROUND

In an existing network infrastructure, if a station (station, STA) that requests a service needs to communicate with other service devices, the station needs to separately perform authentication and association with each service device, even if the service devices to which the station needs to simultaneously connect or between which the station needs to switch a connection belong to a same network or have a same authentication manner. An authentication process is a process of determining whether a station STA that requests a connection is qualified to connect. An association process is a process of exchanging information with each other and establishing a connection. As shown in FIG. 1, a network includes a station STA 101, a first printer 102, a second printer 103, and a notebook computer 104. If the STA 101 needs to communicate with the first printer 102, the second printer 103, and the notebook computer 104, the STA 101 needs to separately perform authentication and association with each of the service devices, that is, the first printer 102, the second printer 103, and the notebook computer 104. If the STA 101 needs to switch from a connection to the first printer 102 to a connection to the second printer 103, the STA also needs to perform authentication and association with the second printer 103 again. In addition, if the service devices, that is, the first printer 102, the second printer 103, and the notebook computer 104, need to communicate with each other, each of the service devices needs to perform authentication and association. For example, if the second printer 103 needs to perform authentication and association with the first printer 102 and the notebook computer 104, the second printer 103 needs to separately perform authentication and association with the first printer 102 and the notebook computer 104. Therefore, when a STA needs to switch a service, or requires multiple services at the same time, the STA needs to perform authentication with multiple service devices, which is rather cumbersome to a user.

SUMMARY

A main technical problem to be resolved by this application is to provide an authentication and association method and system, which can avoid authentication.

To resolve the foregoing technical problem, a first aspect of this application provides an authentication and association method, including:

receiving, by an access point AP, an authentication result query request sent by a service device, where the authentication result query request is used to query whether a station STA that sends an association request to the service device is authenticated by the AP; querying whether the STA is authenticated by the AP; and sending a result of the authentication result query request to the service device, so that the service device determines, according to the result of the authentication result query request, whether to establish an association with the station STA.

With reference to the first aspect, in a first possible implementation manner of the first aspect of this application, before the step of receiving, by an access point AP, authentication result query request sent by a service device, the method includes: performing, by the AP, authentication with the station STA.

A second aspect of this application provides an authentication and association method, including:

receiving, by a service device, an association request sent by a STA; sending an authentication result query request to an AP, where the authentication result query request is used to query whether the STA that sends the association request to the service device is authenticated by the AP; and receiving a result of the authentication result query sent by the AP, and determining, according to the result of the authentication result query request, whether to establish an association with the station STA.

With reference to the second aspect, in a first possible implementation manner of the second aspect of this application, if the STA is authenticated by the AP, the service device establishes an association with the STA; or if the STA fails to be authenticated by the AP, the service device refuses to establish an association with the STA.

A third aspect of this application provides an access point AP, including a receiving module, a querying module, and a sending module, where the receiving module is configured to receive an authentication result query request sent by a service device, where the authentication result query request is used to query whether a station STA that sends an association request to the service device is authenticated by the AP; the querying module is configured to query whether the STA is authenticated by the AP; and the sending module is configured to send a result of the authentication result query request to the service device, so that the service device determines, according to the result of the authentication result query request, whether to establish an association with the station STA.

With reference to the third aspect, in a first possible implementation manner of the third aspect of this application, the AP further includes an authentication module, where the authentication module is configured to perform authentication with the STA and the service device.

A fourth aspect of this application provides a service device, including a receiving module, a sending module, and an association module, where the receiving module is configured to receive an association request sent by a STA, the sending module is configured to send an authentication result query request to an AP, where the authentication result query request is used to query whether the STA that sends the association request to the service device is authenticated by the AP; and the receiving module is further configured to receive a result of the authentication result query request sent by the AP, and determine, according to the result of the authentication result query request, whether to establish an association with the station STA.

With reference to the fourth aspect, in a first possible implementation manner of the fourth aspect of this application, if the STA is authenticated by the AP, the association module is configured to establish an association with the STA; or if the STA fails to be authenticated by the AP, the service device refuses to establish an association with the STA.

A fifth aspect of this application provides an access point AP, including a receiver, a processor, and a transmitter, where the receiver is configured to receive an authentication result query request sent by a service device, where the authentication result query is used to query whether a station STA that sends an association request to the service device is authenticated by the AP; the processor is configured to query whether the STA is authenticated by the AP; and the transmitter is configured to send a result of the authentication result query request to the service device, so that the service device determines, according to the result of the authentication result query request, whether to establish an association with the station STA.

With reference to the fifth aspect, in a first possible implementation manner of the fifth aspect of this application, the processor is further configured to perform authentication with the STA and the service device.

A sixth aspect of this application provides a service device, including a receiver, a transmitter, and a processor, where the receiver is configured to receive an association request sent by a STA; the transmitter is configured to send an authentication result query request to an AP, where the authentication result query request is used to query whether the STA that sends the association request to the service device is authenticated by the AP; the receiver is further configured to receive a result of the authentication result query request sent by the AP, and determine, according to the result of the authentication result query request, whether to establish an association with the station STA; if the STA is authenticated by the AP, the processor is configured to establish an association with the STA; or if the STA fails to be authenticated by the AP, the service device refuses to establish an association with the STA.

A seventh aspect of this application provides an authentication method, including: receiving, by an access point AP, a request that is for acquiring authentication information and that is sent by a service device, where the request for acquiring the authentication information is sent after the service device receives an authentication request sent by a STA; sending an authentication information response to the service device, where the authentication information response includes the authentication information that is required when the service device performs authentication, so that the service device performs authentication on the STA according to the authentication information.

An eighth aspect of this application provides an authentication method, including:

receiving, by a service device, an authentication request sent by a STA; sending a request for acquiring authentication information to an AP; receiving an authentication information response sent by the AP, where the authentication information response includes the authentication information that is required when the service device performs authentication; and performing authentication on the STA that sends the authentication request.

A ninth aspect of this application provides an access point AP, including a receiving module and a sending module; where the receiving module is configured to receive a request that is for acquiring authentication information and that is sent by a service device, where the request for acquiring the authentication information is sent after the service device receives an authentication request sent by a STA; and the sending module is configured to send an authentication information response to the service device, where the authentication information response includes the authentication information that is required when the service device performs authentication, so that the service device performs authentication on the STA according to the authentication information.

A tenth aspect of this application provides a service device, including a receiving module, a sending module, and an authentication module, where the receiving module is configured to receive an authentication request sent by a STA; the sending module is configured to send a request for acquiring authentication information to an AP; and the receiving module is further configured to receive an authentication information response sent by the AP, where the authentication information response includes the authentication information that is required when the service device performs authentication; and the authentication module is configured to perform authentication with the STA.

An eleventh aspect of this application provides an access point AP, including a receiver and a transmitter, where the receiver is configured to receive a request that is for acquiring authentication information and that is sent by a service device, where the request for acquiring the authentication information is sent after the service device receives an authentication request sent by a STA; and the transmitter is configured to send an authentication information response to the service device, where the authentication information response includes the authentication information that is required when the service device performs authentication, so that the service device performs authentication on the STA according to the authentication information.

A twelfth aspect of this application provides a service device, including a receiver, a transmitter, and a processor, where the receiver is configured to receive an authentication request sent by a STA, the transmitter is configured to send a request for acquiring authentication information to an AP, and the receiver is further configured to receive an authentication information response sent by the AP, where the authentication information response includes the authentication information that is required when the service device performs authentication, and the processor is configured to perform authentication on the STA.

In the foregoing solutions, after receiving an association request sent by a station STA, a service device needs to acquire only a result of an authentication result query request from an access point AP, and then whether to establish an association with the STA is determined, by using the foregoing manner, troubles caused by authentication can be avoided.

DESCRIPTION OF EMBODIMENTS

In the following description, for illustration but not limitation, specific details such as a particular system structure, an interface, and a technology are provided to make a thorough understanding of this application. However, persons skilled in the art should know that this application may be practiced in other implementation manners without these specific details. In other cases, detailed descriptions of well-known apparatuses, circuits, and methods are omitted, so that this application is described without being obscured by unnecessary details.

Figure 2:
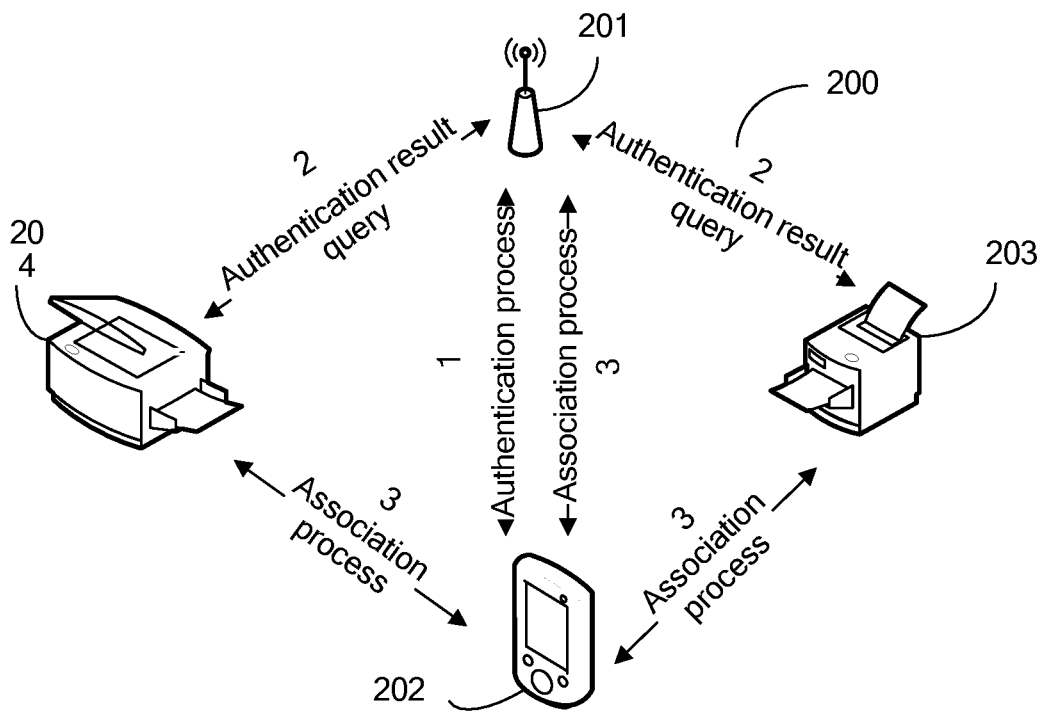
FIG. 2 is a schematic structural diagram of an implementation manner of an authentication and association system according to this application.

Referring to FIG. 2, FIG. 2 is a schematic structural diagram of an implementation manner of an authentication and association system according to this application.

In this implementation manner, an authentication and association system 200 includes an access point AP 201, a station STA 202, a first service device 203, and a second service device 204. Both the first service device 203 and the second service device 204 are special stations STAs 202. Wireless communication can be performed between the access point 201 and the station 202, between the access point 201 and the first service device 203, between the access point 201 and the second service device 204, between the station 202 and the first service device 203, and between the station 202 and the second service device 204.

The access point AP 201 in this implementation manner is a network control device, is a management unit that performs identity authentication on a service device or a STA that needs to establish a connection to a service device, can establish a base station subsystem BSS, and can connect to a distributed system DS.

The station STA 202 is a communications device that has a communication function, such as a mobile phone. After being authenticated and associated, the station STA 202 can communicate with an access point and a service device.

The first service device 203 and the second service device 204 are service devices that have a communication function. Service devices in the present invention may all be regarded as special STAs, such as a printer and a notebook computer. In a general application scenario, for example, in a hotel, the access point 201 is a WiFi access point provided by the hotel, the station 202 is a mobile phone or the like of a guest, and the first service device 203 and the second service device 204 are service devices provided by the hotel. Therefore, the first service device 203 and the second service device 204 generally have been authenticated and associated with the access point 202, and the first service device 203 and the second service device 204 can directly communicate with the access point 201. After obtaining an access password of the access point 201, the guest may connect the station 202 to the access point 201 by using the access password. Therefore, the station 202 sends an authentication request and an association request to the access point 201. After the station 202 is authenticated and associated with an access device 201, a connection is established.

When the guest needs to use the first service device 203 and the second service device 204, the station 202 separately sends an association request to the first service device 203 and the second service device 204. In principle, if the station 202 can be authenticated by the access point 201, that an owner of the station 202 is a guest of the hotel can be learned; the owner should have a right to use a service device provided by the hotel. Therefore, after receiving the association request, the first service device 203 and the second service device 204 only need to send an authentication result query request to the access point 201 to query whether the station 202 has been authenticated by the access point 201. If the station 202 has been authenticated by the access point 201, it may be regarded that the station 202 has been authenticated by the first service device 203 and the second service device 204. After the first service device 203 and the second service device 204 are separately associated with the station 202, the first service device 203 and the second service device 204 establish connections to the station 202. If the station 202 fails to be authenticated by the access point 201, the station 202 cannot establish an association with the first service device 203 or the second service device 204.

Figure 1:
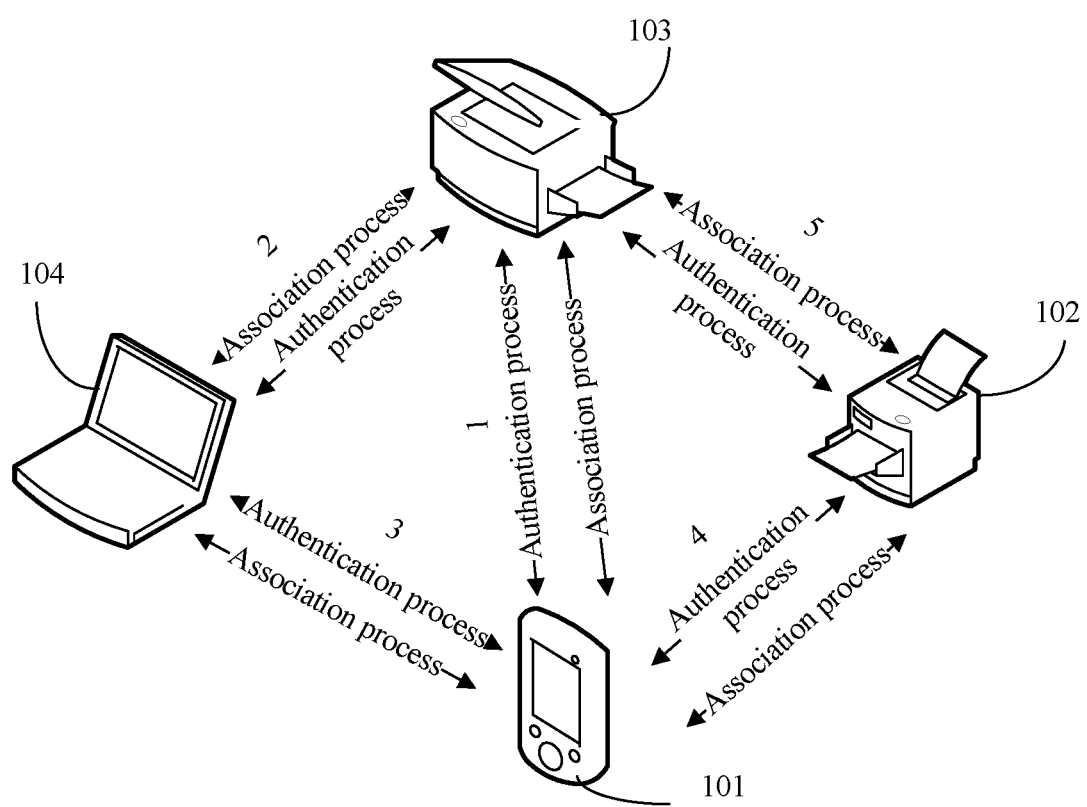
FIG. 1 is a schematic structural diagram of authentication and association in the prior art.

In the prior art in FIG. 1, when a STA 101 needs to connect to a first printer 102 or a computer 104, the STA 101 needs to perform authentication and association with the first printer 102 or the computer 104; when the STA 101 needs to establish connections to the first printer 102 and the computer 104 at the same time, the STA 101 needs to separately perform authentication and association with the first printer 102 and the computer 104. Compared with the prior art, in this application, as shown in FIG. 2, when the STA 202 needs to connect to the first service device 203 or the second service device 204, after the first service device 203 or the second service device 204 receives an association request sent by the STA 202, the first service device 203 or the second service device 204 only needs to acquire an authentication query result from the access point AP 201, so as to determine whether the STA 202 is authenticated. If the STA 202 is authenticated by the AP 201, the STA 202 can directly establish an association with the service device. As is known to all, a process in which the service device acquires the authentication query result from the AP 201 is far simpler than a process in which the station STA performs authentication, and when the STA 202 needs to establish connections to multiple service devices such as the first service device 203 and the second service device 204 at the same time, this advantage is more obvious. Therefore, in this application, a process in which a station STA establishes a connection to a service device is simplified to a great extent.

Figure 3:
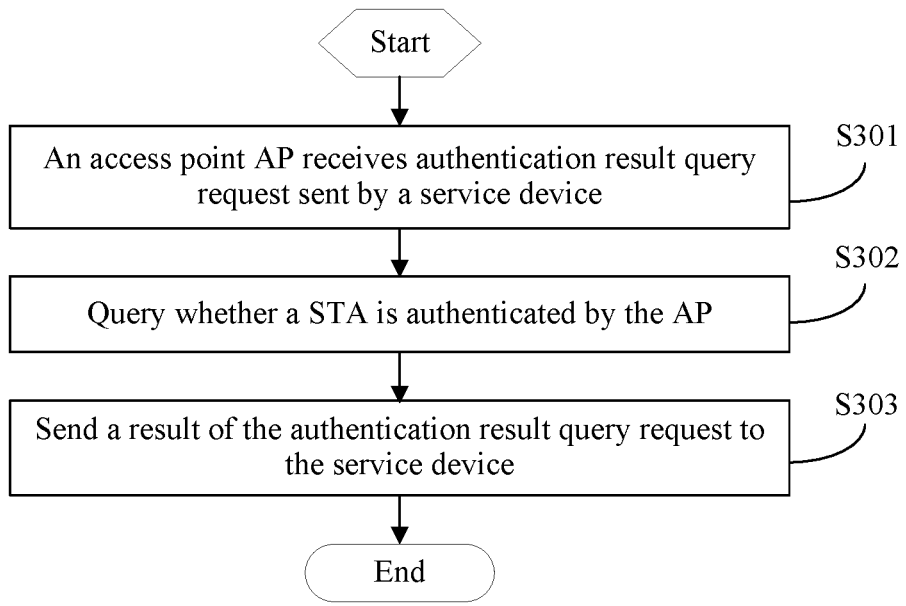
FIG. 3 is a flowchart of a first possible implementation manner of an authentication and association method according to this application.

Referring to FIG. 3, FIG. 3 is a flowchart of a first possible implementation manner of an authentication and association method according to this application.

This implementation manner includes:

S301: An access point AP receives an authentication result query request sent by a service device, where the authentication result query request is used to query whether a station STA that sends an association request to the service device is authenticated by the AP.

If the STA is authenticated by the access point, it may be considered that the station is qualified to establish a connection to the service device. Therefore, when the service device receives the association request sent by the station, the service device sends the authentication result query request to the access point, and the access point correspondingly receives the authentication result query request sent by the service device.

S302: Query whether the STA is authenticated by the AP.

S303: The access point AP sends a result of the authentication result query request to the service device, so that the service device determines, according to the result of the authentication result query request, whether to establish an association with the station STA.

After receiving the authentication result query request sent by the service device, the AP determines whether the STA that sends the association request to the service device is authenticated, and sends the authentication result to the service device. If the authentication result shows that the STA has been authenticated by the AP, it indicates that the STA is qualified to establish an association with the service device; or if the authentication result shows that the STA fails to be authenticated by the AP, the STA cannot establish an association with the service device, and the procedure is ended.

In the foregoing solution, a service device can learn, by directly querying an AP for a result, whether a STA that sends an association request to a service device is authenticated, without performing authentication with the STA again. When performing handover communication with service devices that have a same authentication manner or performing communication with multiple service devices at the same time, the STA needs to perform authentication with the AP for only once, which avoids troubles caused by authentication.

Figure 4:
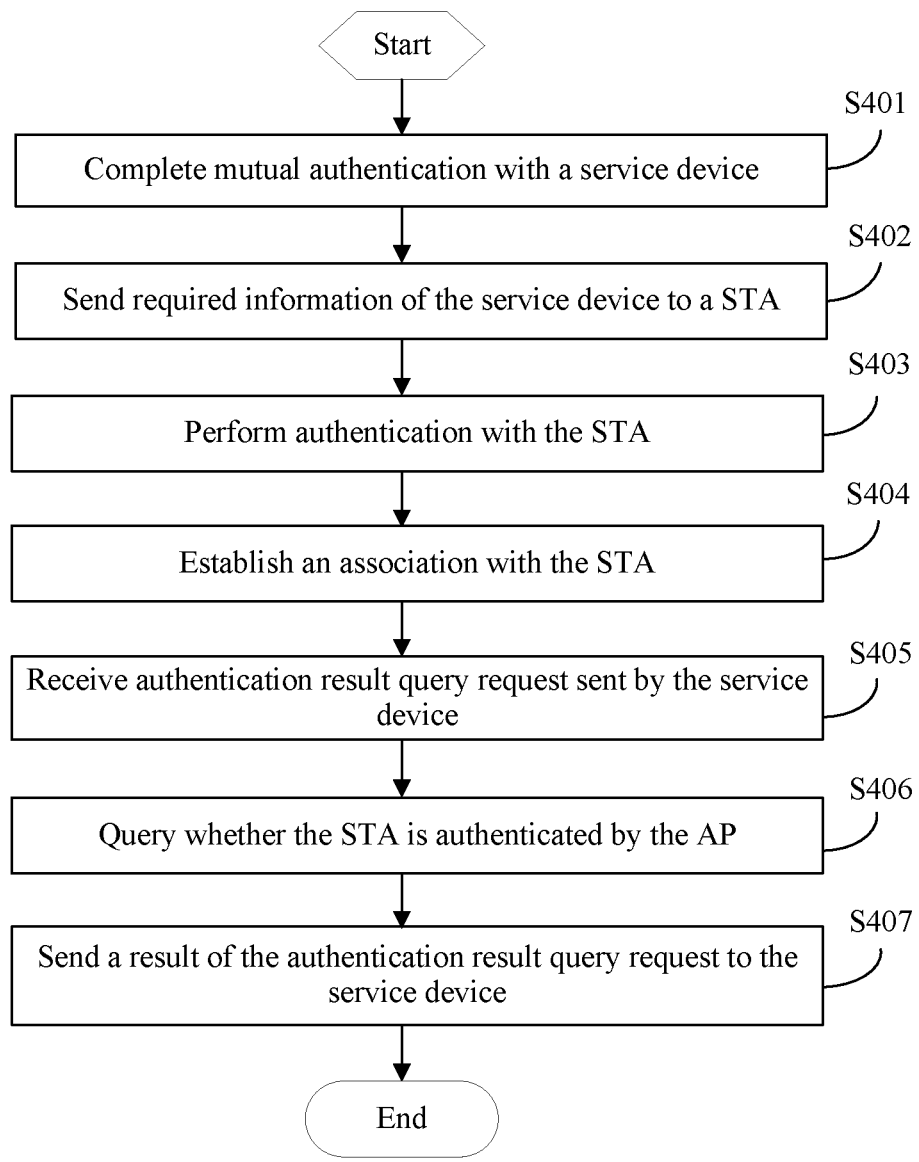
FIG. 4 is a flowchart of a second possible implementation manner of an authentication and association method according to this application.

Referring to FIG. 4, FIG. 4 is a flowchart of a second possible implementation manner of an authentication and association method according to this application.

This implementation manner includes:

S401: An AP and a service device that are located in a same network complete mutual authentication.

The AP and a service device that are located in a same network may complete mutual authentication by manual setting. For example, an access point of a hotel and a service device provided in the hotel may complete mutual authentication by setting in advance.

S402: The AP sends information about the service device to a STA, where the service device and the AP have completed mutual authentication. For example, after a guest enters a hotel, an access point AP of the hotel sends, to the guest, information about a service device that can be used in the hotel, such as a printer, so as to provide a reference for the guest to determine whether there is a need to use the service device; when determining that there is a need to establish a connection to a service device, the guest performs authentication with the AP.

S403: The AP exchanges authentication information with the STA and completes authentication.

S404: The AP establishes an association with the STA, where the establishing an association includes that the AP exchanges a name, an address, a rate, and a power of a device with the STA, and further includes that the STA completes registration on a distributed system DS.

S405: The access point AP receives an authentication result query request sent by the service device, where the authentication result query is used to query whether the station STA that sends an association request to the service device is authenticated by the AP.

If the station STA is authenticated by the access point AP, it may be considered that the station STA is qualified to establish a connection to the service device. Therefore, when the service device receives the association request sent by the station, the service device sends the authentication result query request to the access point to determine whether the STA is qualified to establish an association with the service device.

S406: The access point AP queries whether the STA is authenticated by the AP.

S407: The access point AP sends a result of the authentication result query request to the service device, so that the service device determines, according to the result of the authentication result query request, whether to establish an association with the station STA.

The access point AP sends the result of the authentication result query request to the service device. If the authentication result shows that the STA has been authenticated by the AP, it indicates that the STA is qualified to establish an association with the service device; or if the authentication result shows that the STA fails to be authenticated by the AP, the STA cannot establish an association with the service device.

In the foregoing solution, after a service device receives an association request sent by a STA, the service device determines, by directly querying an AP, whether the STA is authenticated; if the STA is authenticated by the AP, the service device establishes an association with the STA; or if the STA fails to be authenticated by the AP, the service device refuses to establish an association with the STA, and optionally, the service device may send a reply message to the STA to refuse to establish an association, and the service device does not need to perform authentication with the STA again. When performing handover communication with service devices that have a same authentication manner or performing communication with multiple service devices at the same time, the STA needs to perform authentication with the AP for only once, which avoids troubles caused by authentication.

Figure 5:
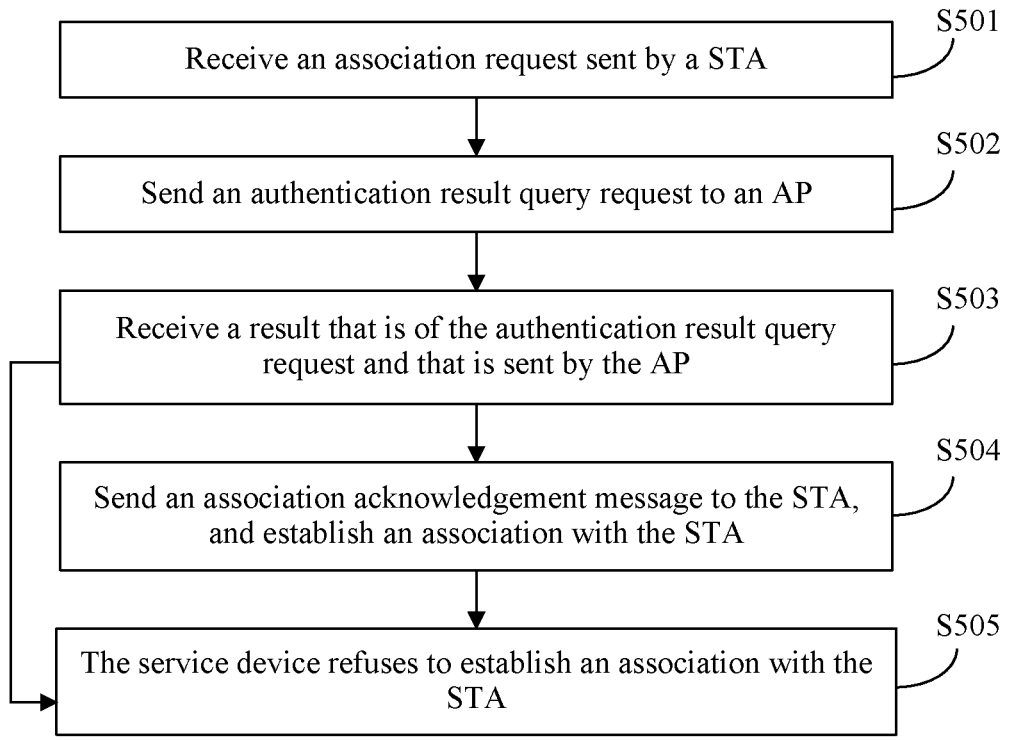
FIG. 5 is a flowchart of a third possible implementation manner of an authentication and association method according to this application.

Referring to FIG. 5, FIG. 5 is a flowchart of a third possible implementation manner of an authentication and association method according to this application. This implementation manner includes:

S501: A service device receives an association request sent by a station STA.

S502: The service device sends an authentication result query request to an AP, where the authentication result query is used to query whether the STA that sends the association request to the service device is authenticated by the AP.

If the station STA is authenticated by the access point AP, it may be considered that the station STA is qualified to establish a connection to the service device. Therefore, the service device sends the authentication result query request to the access point to determine whether the STA is qualified to establish an association with the service device.

S503: The service device receives a result of the authentication result query request sent by the AP, and determines, according to the result of the authentication result query request, whether to establish an association with the station STA; if the authentication query result indicates that the STA has been authenticated by the AP, perform step S504; or if the STA fails to be authenticated by the AP, perform step S505.

S504: The service device sends an association acknowledgement message to the STA, and establishes an association with the STA, where the establishing an association includes that the STA exchanges a name, an address, a rate, and a power of a device with the service device.

S505: The service device refuses to establish an association with the STA.

Optionally, the service device may send a reply message to the STA to refuse to establish an association with the STA.

In the foregoing solution, a service device determines, by querying an AP, whether a STA that sends an association request to the service device is authenticated; if the STA is authenticated, the service device establishes an association with the STA; or if the STA fails to be authenticated, the service device refuses to establish an association with the STA. By using the foregoing manner, when performing handover communication with service devices that have a same authentication manner or performing communication with multiple service devices at the same time, the STA needs to perform authentication with the AP for only once, and does not need to perform authentication with each service device again, which avoids troubles caused by authentication that is performed for multiple times.

Figure 6:
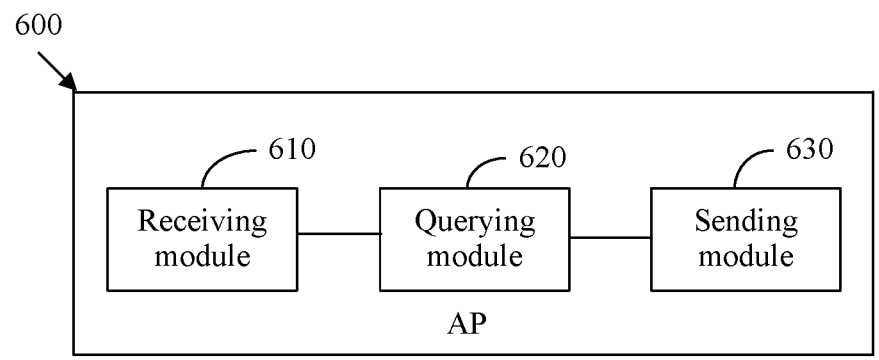
FIG. 6 is a schematic structural diagram of a first possible implementation manner of an access point AP according to this application.

As shown in FIG. 6, FIG. 6 is a schematic structural diagram of a first possible implementation manner of an access point AP according to this application. An AP 600 in this implementation manner includes a receiving module 610, a querying module 620, and a sending module 630.

The receiving module 610 is configured to receive an authentication result query request sent by a service device, where the authentication result query request is used to query whether a station STA that sends an association request to the service device is authenticated by the AP 600.

If the station is authenticated by the access point AP 600, it may be considered that the station is qualified to establish a connection to the service device. Therefore, when the service device receives the association request sent by the station, the service device sends the authentication result query request to the access point, and the receiving module 610 correspondingly receives the authentication result query request sent by the service device.

The querying module 620 is configured to query whether the STA is authenticated by the AP 600.

The sending module 630 is configured to send a result of the authentication result query request to the service device, so that the service device determines, according to the result of the authentication result query request, whether to establish an association with the station STA.

Specifically, after the receiving module 610 receives an authentication query result that is sent by a service device and that is used to query whether a STA that sends an association request to the service device is authenticated by the AP 600, the querying module 620 queries whether the STA is authenticated by the AP 600, and then the sending module 630 sends a result to the service device, so that the service device determines, according to the result of the authentication result query request, whether to establish an association with the station STA. If the authentication result shows that the STA has been authenticated by the AP, it indicates that the STA is qualified to establish an association with the service device; or if the authentication result shows that the STA fails to be authenticated by the AP, the STA cannot establish an association with the service device, where the establishing an association includes that the service device exchanges a name, an address, a rate, and a power of a device with the STA.

In the foregoing solution, after a service device receives an association request sent by a STA, the service device determines, by directly querying an AP, whether the STA is authenticated; if the STA is authenticated by the AP, the service device establishes an association with the STA; or if the STA fails to be authenticated by the AP, the service device refuses to establish an association with the STA, and the service device does not need to perform authentication with the STA again. When performing handover communication with service devices that have a same authentication manner or performing communication with multiple service devices at the same time, the STA needs to perform authentication with the AP for only once, which avoids troubles caused by authentication.

Figure 7:
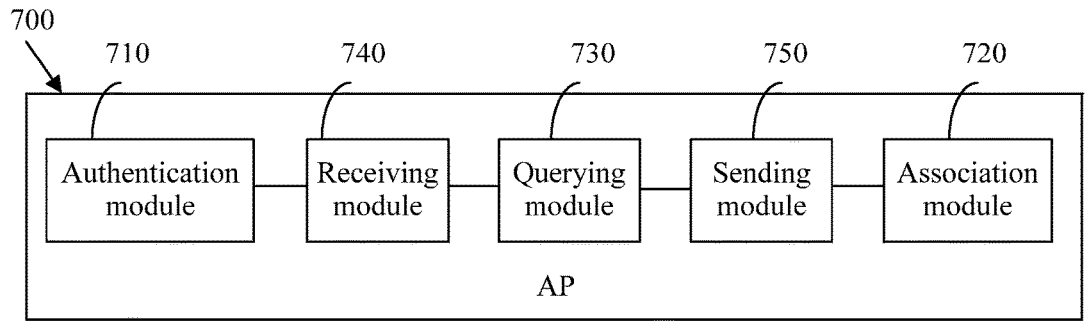
FIG. 7 is a schematic structural diagram of a second possible implementation manner of an access point AP according to this application.

As shown in FIG. 7, FIG. 7 is a schematic structural diagram of a second possible implementation manner of an access point AP according to this application. An access point AP 700 in this implementation manner includes an authentication module 710, an association module 720, a receiving module 740, a querying module 730, and a sending module 750.

The authentication module 710 is configured to perform authentication with a STA and a service device. For example, after a guest enters a hotel, an access point AP of the hotel sends, to the guest, information about a service device that can be used in the hotel, such as a printer, so as to provide a reference for the guest to determine whether there is a need to use the service device; when determining that there is a need to establish a connection to a service device, the guest may perform authentication with the AP.

The association module 720 is configured to establish an association with the STA, where the establishing an association includes that the AP exchanges a name, an address, a rate, and a power of a device with the STA, and further includes that the STA completes registration on a distributed system DS.

The querying module 730 is configured to query whether the STA is authenticated by the AP 700.

The receiving module 740 is configured to receive an authentication result query request sent by the service device, where the authentication result query request is used to query whether the station STA that sends an association request to the service device is authenticated by the AP 700.

If the STA is authenticated by the access point AP 700, it may be considered that the station STA is qualified to establish a connection to the service device. Therefore, when the service device receives the association request sent by the station, the service device sends the authentication result query request to the access point to determine whether the STA is qualified to establish an association with the service device.

The sending module 750 is configured to send a result of the authentication result query request to the service device, so that the service device determines, according to the result of the authentication result query request, whether to establish an association with the station STA.

If the authentication result shows that the STA has been authenticated by the AP, it indicates that the STA is qualified to establish an association with the service device; or if the authentication result shows that the STA fails to be authenticated by the AP, the STA cannot establish an association with the service device.

Figure 8:
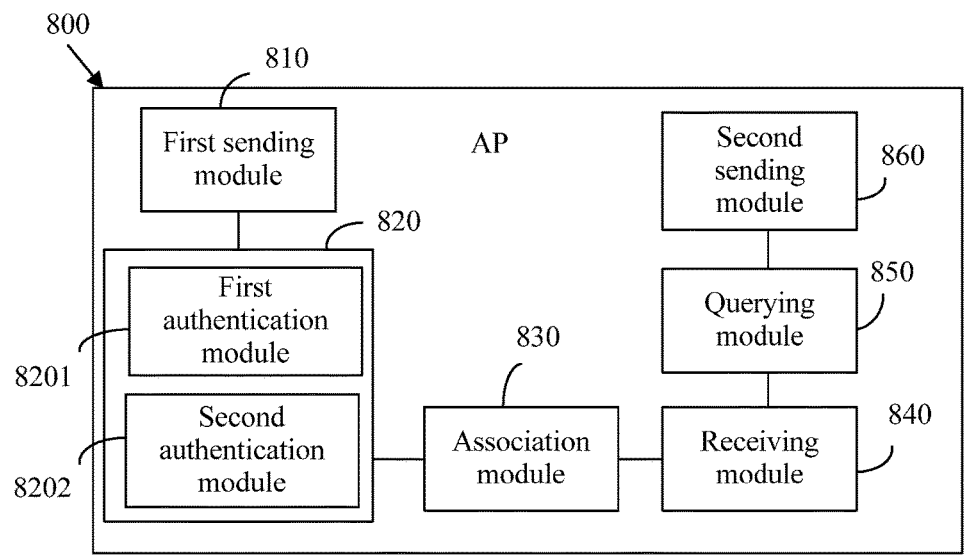
FIG. 8 is a schematic structural diagram of a third possible implementation manner of an access point AP according to this application.

To further describe a working process of the AP in FIG. 7 more clearly, refer to FIG. 8. FIG. 8 is a schematic structural diagram of a third possible implementation manner of an access point AP according to this application, which further describes the AP 700 in FIG. 7 in detail. An AP 800 in this implementation manner includes a first sending module 810, an authentication module 820, an association module 830, a receiving module 840, a querying module 850, and a second sending module 860, where the authentication module 820 includes a first authentication module 8201 and a second authentication module 8202.

The first sending module 810 is configured to send information about a service device to a station STA. For example, after a guest enters a hotel, an access point AP of the hotel sends, to the guest, information about a service device that can be used in the hotel, such as a printer, so as to provide a reference for the guest to determine whether there is a need to use the service device; when determining that there is a need to establish a connection to a service device, the guest may perform authentication with the AP.

The first authentication module 8201 is configured to exchange authentication information with the STA and complete authentication, where the STA is the STA that receives the information about the service device sent by the AP and that has select, according to required information, a service device to which the STA needs to connect.

The second authentication module 8202 is configured to complete authentication with a service device that is located in a same network with the AP 800.

The association module 830 is configured to establish an association with the STA, where the establishing an association includes that the AP exchanges a name, an address, a rate, and a power of a device with the STA, and further includes that the STA completes registration on a distributed system DS.

The receiving module 840 is configured to receive an authentication result query request sent by the service device, where the authentication result query request is used to query whether the station STA that sends an association request to the service device is authenticated by the AP 800.

The querying module 850 is configured to query whether the STA is authenticated by the AP 800.

If the station STA is authenticated by the access point AP, it may be considered that the station STA is qualified to establish a connection to the service device. Therefore, when the service device receives the association request sent by the station, the service device sends the authentication result query request to the access point to determine whether the STA is qualified to establish an association with the service device.

The second sending module 860 is configured to send a result of the authentication result query request to the service device, so that the service device determines, according to the result of the authentication result query request, whether to establish an association with the station STA.

If the authentication result shows that the STA has been authenticated by the AP, it indicates that the STA is qualified to establish an association with the service device; or if the authentication result shows that the STA fails to be authenticated by the AP, the STA cannot establish an association with the service device.

Specifically, the second authentication module 8202 performs authentication with a service device that is located in a same network with the AP 800; after the authentication is completed, the first sending module 810 sends information about the service device to a STA, where the service device is the foregoing service device that completes mutual authentication with the AP 800; after the STA receives the information about the service device and selects, according to required information, a service device to which the STA needs to connect, the first authentication module 8201 exchanges authentication information with the STA and completes authentication; and then the association module 830 establish an association with the STA; after the STA sends an association request to the service device, the receiving module 840 receives authentication result query request sent by the service device, where the authentication result query is used to query whether the station STA that sends an association request to the service device is authenticated by the AP; the querying module 850 queries whether the STA is authenticated by the AP 800, and the second sending module 860 sends an authentication query result to the service device, so that the service device determines, according to the result of the authentication result query request, whether to establish an association with the station STA.

In the foregoing solution, after a service device receives an association request sent by a STA, the service device determines, by directly querying an AP, whether the STA is authenticated; if the STA is authenticated by the AP, the service device establishes an association with the STA; or if the STA fails to be authenticated by the AP, the service device refuses to establish an association with the STA, and the service device does not need to perform authentication with the STA again. When performing handover communication with service devices that have a same authentication manner or performing communication with multiple service devices at the same time, the STA needs to perform authentication with the AP for only once, which avoids troubles caused by authentication.

Figure 9:
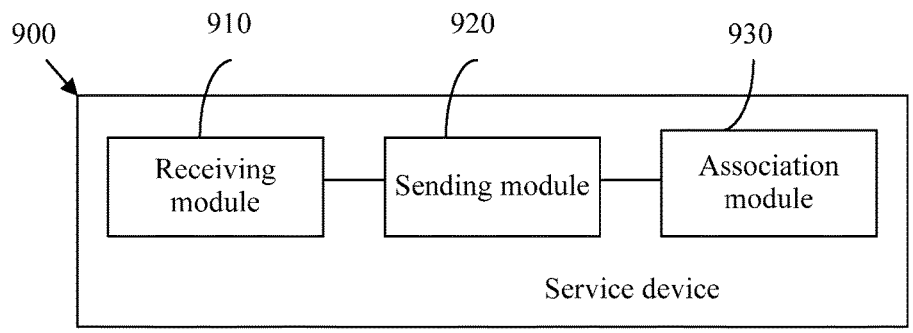
FIG. 9 is a schematic structural diagram of a first possible implementation manner of a service device according to this application.

Referring to FIG. 9, FIG. 9 is a schematic structural diagram of a first possible implementation manner of a service device according to this application. A service device 900 in this implementation manner includes a receiving module 910, a sending module 920, and an association module 930.

The receiving module 910 is configured to receive an association request sent by a station STA.

The sending module 920 is configured to send an authentication result query request to an AP, where the authentication result query is used to query whether the STA that sends the association request to the service device is authenticated by the AP. If the station STA is authenticated by the access point AP, it may be considered that the station STA is qualified to establish a connection to the service device. Therefore, the sending module 920 sends the authentication result query request to the access point to determine whether the STA is qualified to establish an association with the service device.

The receiving module 910 is further configured to receive a result of the authentication result query sent by the AP, and determine, according to the result of the authentication result query request, whether to establish an association with the station STA.

If the authentication query result indicates that the STA that sends the association request to the service device is authenticated by the AP, the service device 900 considers that the station STA is qualified to establish a connection to the service device 900, and in this case, the sending module 920 is configured to send an association acknowledgement message to the STA. The association module 930 is configured to establish an association with the STA, where the establishing an association includes that the service device exchanges a name, an address, a rate, and a power of a device with the STA.

If the STA fails to be authenticated by the AP, the association module 930 refuses to establish an association with the STA. Optionally, the sending module 920 sends a reply message to the STA to refuse to establish an association with the STA.

Figure 10:
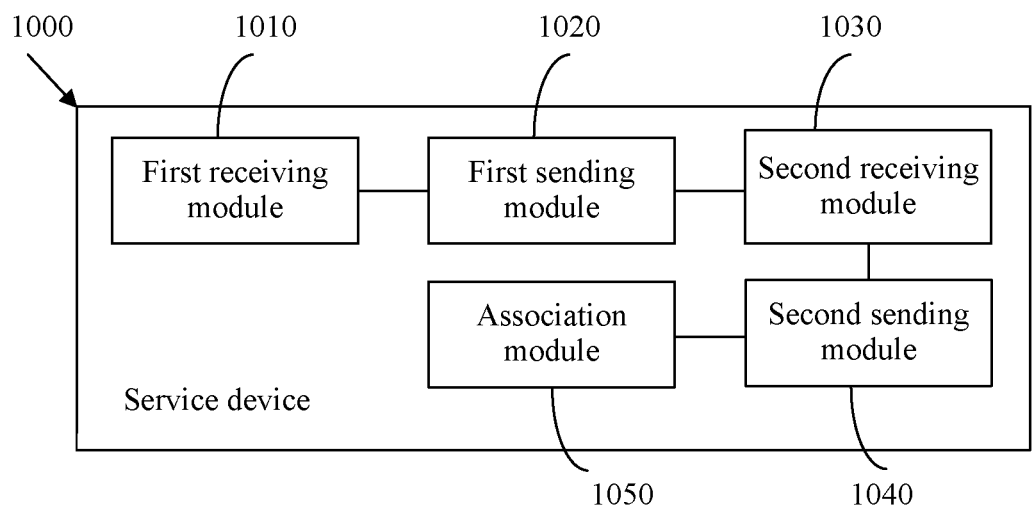
FIG. 10 is a schematic structural diagram of a second possible implementation manner of a service device according to this application.

To further describe the service device 900 in more detail, referring to FIG. 10, FIG. 10 is a schematic structural diagram of a second possible implementation manner of a service device according to this application. A service device 1000 in FIG. 10 provides further details of the service device 900 in FIG. 9. The service device 1000 in this implementation manner includes a first receiving module 1010, a first sending module 1020, a second receiving module 1030, a second sending module 1040, and an association module 1050.

The first receiving module 1010 is configured to receive an association request sent by a station STA.

The first sending module 1020 is configured to send an authentication result query request to an AP, where the authentication result query is used to query whether the STA that sends the association request to the service device is authenticated by the AP. If the station STA is authenticated by the access point AP, it may be considered that the station STA is qualified to establish a connection to the service device.

The second receiving module 1030 is configured to receive a result of the authentication result query request sent by the AP, and determine, according to the result of the authentication result query request, whether to establish an association with the station STA.

If the station STA is authenticated by the access point AP, the service device 1000 considers that the station STA is qualified to establish a connection to the service device 1000, and in this case, the second sending module 1040 is configured to send an association acknowledgement message to the STA.

If the STA fails to be authenticated by the AP, the STA cannot establish an association with the service device 1000, and the second sending module 1040 is configured to send a reply message to the STA to refuse to accept the association request.

The association module 1050 is configured to establish an association with the STA, where the establishing an association includes that the service device exchanges a name, an address, a rate, and a power of a device with the STA.

Specifically, the first receiving module 1010 receives an association request sent by a STA; after the request is received, in order to determine whether the STA that sends the association request to the service device is authenticated by an AP, the first sending module 1020 sends an authentication result query request to the AP; after the AP sends an authentication result to the service device 1000, the second receiving module 1030 receives the result that is of the authentication result query request and that is sent by the AP, and determines, according to the result of the authentication result query request, whether to establish an association with the station STA. If the authentication query result indicates that the STA that sends the association request to the service device is authenticated by the AP, the second sending module 1040 sends an association acknowledgement message to the STA, and the association module 1050 establishes an association with the STA; or if the STA fails to be authenticated by the AP, the service device sends a reply message to the STA to refuse to accept the association request.

In the foregoing solution, a service device determines, by querying an AP, whether a STA that sends an association request to the service device is authenticated; if the STA is authenticated, the service device establishes an association with the STA; or if the STA fails to be authenticated, the service device refuses to establish an association with the STA. By using the foregoing manner, when performing handover communication with service devices that have a same authentication manner or performing communication with multiple service devices at the same time, the STA needs to perform authentication with the AP for only once, and does not need to perform authentication with each service device again, which avoids troubles caused by authentication that is performed for multiple times.

Figure 11:
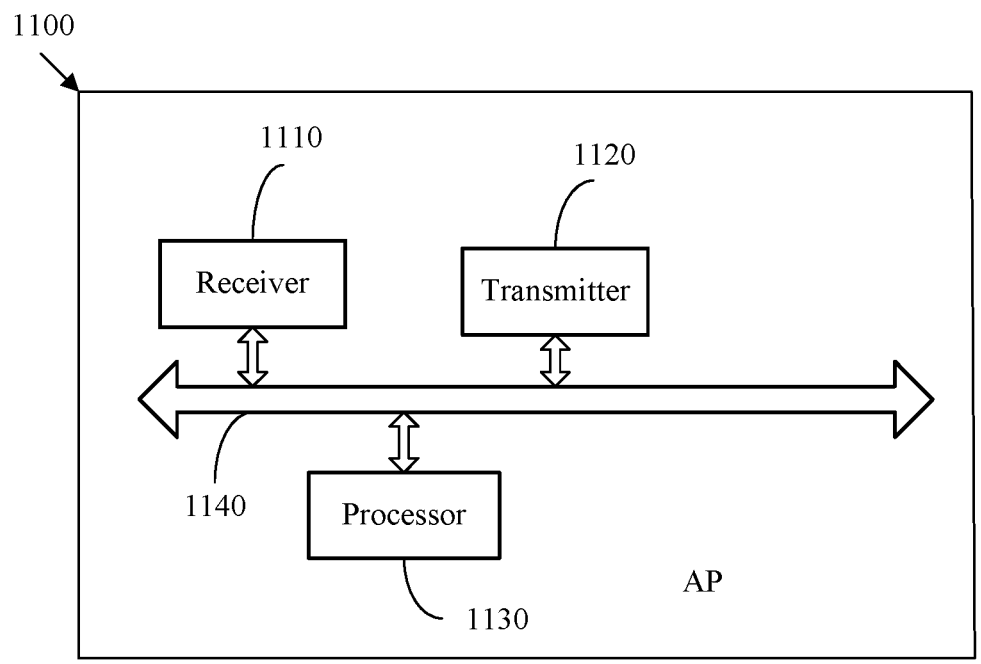
FIG. 11 is a schematic structural diagram of an apparatus of a first possible implementation manner of an access point AP according to this application.

Referring to FIG. 11, FIG. 11 is a schematic structural diagram of an apparatus of a first possible implementation manner of an access point AP according to this application. An AP 1100 in this implementation manner includes a receiver 1110, a transmitter 1120, and a processor 1130.

The receiver 1110 is configured to receive an authentication result query request sent by a service device, where the authentication result query request is used to query whether a station STA that sends an association request to the service device is authenticated by the AP 1100.

If the STA is authenticated by the access point AP 1100, it may be considered that the STA is qualified to establish a connection to the service device. Therefore, when the service device receives the association request sent by the STA, the service device sends the authentication result query request to the access point, and the receiver 1110 correspondingly receives the authentication result query request sent by the service device.

The processor 1130 is configured to query whether the STA is authenticated by the AP.

The transmitter 1120 is configured to send a result of the authentication result query request to the service device, so that the service device determines, according to the result of the authentication result query request, whether to establish an association with the station STA.

If the authentication result shows that the STA has been authenticated by the AP 1100, it indicates that the STA is qualified to establish an association with the service device; or if the authentication result shows that the STA fails to be authenticated by the AP 1100, the STA cannot establish an association with the service device.

The processor 1130 is further configured to perform authentication with the STA and the service device, and is further configured to establish an association with the STA, where the establishing an association includes that the AP exchanges a name, an address, a rate, and a power of a device with the STA, and further includes that the STA completes registration on a distributed system DS. For example, after a guest enters a hotel, an access point AP of the hotel sends, to the guest, information about a service device that can be used in the hotel, such as a printer, so as to provide a reference for the guest to determine whether there is a need to use the service device; when determining that there is a need to establish a connection to a service device, the guest may perform authentication with the AP. In this case, the processor 1130 needs to perform authentication with the STA, and before the authentication, the AP 1100 needs to complete authentication and association with the service device.

All components of the AP 1100 are coupled together by using a bus 1140, where the bus 1140 includes a data bus, and may further include a power bus, a control bus, a status signal bus, and the like. However, for clarity of description, various buses are marked as the bus 1140 in the figure.

Specifically, the processor 1130 performs authentication with a service device that is located in a same network with the AP 1100; after the authentication is completed, the transmitter 1120 sends information about the service device to a STA, where the service device is the foregoing service device that completes mutual authentication with the AP 1100; after the STA receives the information about the service device and selects, according to required information, a service device to which the STA needs to connect, the processor 1130 exchanges authentication information with the STA and completes authentication, and then establishes an association with the STA. After the STA sends an association request to the service device, the receiver 1110 receives an authentication result query request sent by the service device, where the authentication result query request is used to query whether the station STA that sends the association request to the service device is authenticated by the AP 1100, and in this case, the processor 1130 queries whether the STA is authenticated by the AP 1110; if an authentication result shows that the STA has been authenticated by the AP 1110, it indicates that the STA is qualified to establish an association with the service device, and in this case, the transmitter 1120 sends, to the service device, the authentication result of the STA that sends the association request to the service device, so that the service device determines, according to the result of the authentication result query request, whether to establish an association with the station STA, and then the processor 1130 establishes an association with the STA, and enables the STA to register on a distributed system; or if an authentication result shows that the STA fails to be authenticated by the AP 1110, the STA cannot establish an association with the service device.

In the foregoing solution, after a service device receives an association request sent by a STA, the service device determines, by directly querying an AP, whether the STA is authenticated; if the STA is authenticated by the AP, the service device establishes an association with the STA; or if the STA fails to be authenticated by the AP, the service device refuses to establish an association with the STA, and the service device does not need to perform authentication with the STA again. When performing handover communication with service devices that have a same authentication manner or performing communication with multiple service devices at the same time, the STA needs to perform authentication with the AP for only once, which avoids troubles caused by authentication.

Figure 12:
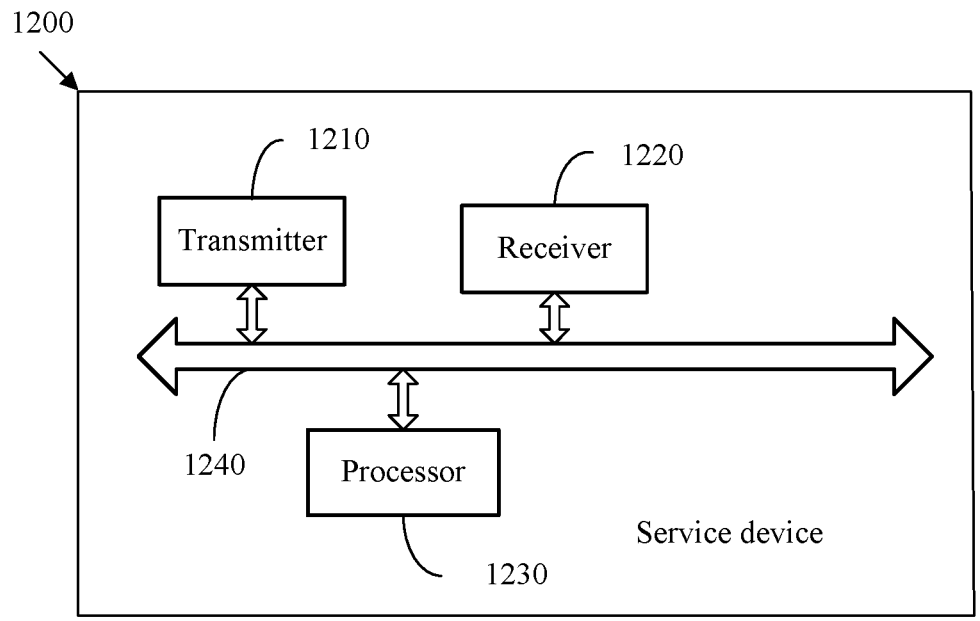
FIG. 12 is a schematic structural diagram of an apparatus of a first possible implementation manner of a service device according to this application.

Referring to FIG. 12, FIG. 12 is a schematic structural diagram of an apparatus of a first possible implementation manner of a service device according to this application. A service device 1200 in this implementation manner includes a transmitter 1210, a receiver 1220, and a processor 1230. All components of the service device 1200 are coupled together by using a bus 1240, where the bus 1240 includes a data bus, and may further include a power bus, a control bus, a status signal bus, and the like. However, for clarity of description, various buses are marked as the bus 1240 in the figure.

The receiver 1220 is configured to receive an association request sent by a station STA.

The transmitter 1210 is configured to send authentication result query request to an AP, where the authentication result query is used to query whether the STA that sends the association request to the service device is authenticated by the AP.

If the station STA is authenticated by the access point AP, it may be considered that the station STA is qualified to establish a connection to the service device. Therefore, the service device sends the authentication result query request to the access point to determine whether the STA is qualified to establish an association with the service device.

The receiver 1220 is further configured to receive a result of the authentication result query sent by the AP, and determine, according to the result of the authentication result query request, whether to establish an association with the station STA.

If the station STA is authenticated by the access point AP, the service device 1200 considers that the station STA is qualified to establish a connection to the service device 1200, the transmitter 1210 is configured to send an association acknowledgement message to the STA, and in this case, the processor 1230 is configured to establish an association with the STA, where the establishing an association includes that the service device 1200 exchanges a name, an address, a rate, and a power of a device with the STA.

If the STA fails to be authenticated by the AP, the STA cannot establish an association with the service device 1200, and the transmitter 1210 is configured to send a reply message to the STA to refuse to accept the association request.

Specifically, the receiver 1220 receives an association request sent by a STA; after the request is received, in order to determine whether the STA that sends the association request to the service device 1200 is authenticated by an AP, the transmitter 1210 sends authentication result query request to the AP; after the AP sends an authentication result to the service device 1200, the receiver 1220 receives the result that is of the authentication result query and that is sent by the AP, and determines, according to the result of the authentication result query request, whether to establish an association with the station STA. If the authentication query result indicates that the STA that sends the association request to the service device 1200 is authenticated by the AP, the transmitter 1210 sends an association acknowledgement message to the STA, and the processor 1230 establishes an association with the STA. If the STA fails to be authenticated by the AP, the service device 1200 may send a reply message to the STA to refuse to accept the association request.

In the foregoing solution, a service device determines, by querying an AP, whether a STA that sends an association request to the service device is authenticated; if the STA is authenticated, the service device establishes an association with the STA; or if the STA fails to be authenticated, the service device refuses to establish an association with the STA. By using the foregoing manner, when performing handover communication with service devices that have a same authentication manner or performing communication with multiple service devices at the same time, the STA needs to perform authentication with the AP for only once, and does not need to perform authentication with each service device again, which avoids troubles caused by authentication that is performed for multiple times.

Figure 13:
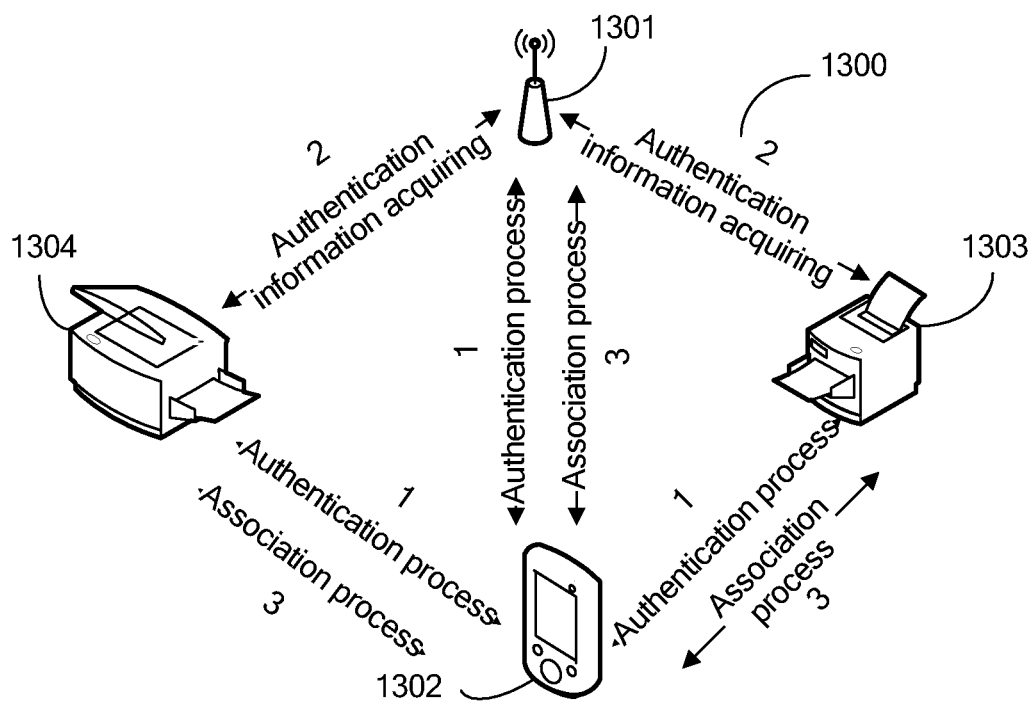
FIG. 13 is a schematic structural diagram of another implementation manner of an authentication and association system according to this application.

Referring to FIG. 13, FIG. 13 is a schematic structural diagram of another implementation manner of an authentication and association system according to this application. An authentication and association system 1300 in this implementation manner includes an access point AP 1301, a station STA 1302, a first service device 1303, and a second service device 1304. Both the first service device 1303 and the second service device 1304 are special stations STAs. Wireless communication can be performed between the access point 1301 and the station 1302, between the access point 1301 and the first service device 1303, between the access point 1301 and the second service device 1304, between the station 1302 and the first service device 1303, and between the station 1302 and the second service device 1304.

The access point AP 1301 in this implementation manner is a network control device, is a management unit that performs identity authentication on a service device or a STA that needs to establish a connection to a service device, can establish a base station subsystem BSS, and can connect to a distributed system DS. The access point AP 1301 includes WiFi and the like.

The station STA 1302 is a communications device that has a communication function, such as a mobile phone. After being authenticated and associated, the station STA 1302 can communicate with an access point and a service device.

The first service device 1303 and the second service device 1304 are service devices that have a communication function, such as a printer or a notebook computer. It should be noted that service devices in the present invention are special STAs.

In a general application scenario, for example, in a hotel, the access point 1301 is a WiFi access point provided by the hotel, the station 1302 is a mobile phone and the like of a guest, and the first service device 1303 and the second service device 1304 are service devices provided by the hotel. However, a service device in many large hotels does not have authentication information required by the service device to establish authentication with a station STA or another service device; the authentication information of the service device is generally stored in an access point AP that is located in a same network with the service device. Therefore, when a STA sends an authentication request to the service device, the service device acquires the authentication information of the service device from the AP, and then establishes authentication with the STA that sends the authentication request to the service device.

When a guest needs to use the first service device 1303 and the second service device 1304, the station STA 1302 separately sends authentication requests to the first service device 1303 and the second service device 1304. In principle, if the first service device 1303 and the second service device 1304 exchange authentication information with the STA 1302 after receiving the authentication requests, the authentication is completed. However, the first service device 1303 and the second service device 1304 do not have authentication messages of their own. Therefore, the first service device 1303 and the second service device 1304 need to acquire the authentication informations from the AP 1301, and then complete the authentication with the STA 1302.

Compared with the prior art, when a STA 101 in FIG. 1 needs to connect to a first printer 102 or a computer 104, or a computer 104 needs to establish a connection to a first printer 102 that is located in a same hotel with the computer 104, if the first printer 102 or the computer 104 does not have authentication information of its own, this connection process cannot be implemented, which affects normal use by a customer. In this implementation manner, after receiving an authentication request of a STA or anther service device, a first service device 1303 and a second service device 1304 or more other service devices need to acquire only authentication messages from an AP 1301, and then authentication can be implemented, which makes a connection process more flexible, and avoids affecting normal use by a user.

Figure 14:
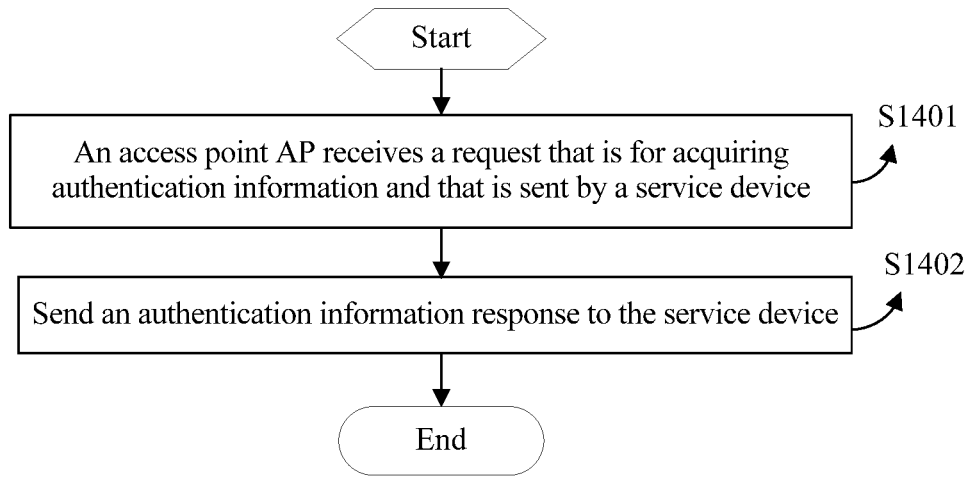
FIG. 14 is a flowchart of a first possible implementation manner of an authentication method according to this application.

Referring to FIG. 14, FIG. 14 is a flowchart of a first possible implementation manner of an authentication method according to this application. This implementation manner includes:

S1401: An access point AP receives a request that is for acquiring authentication information and that is sent by a service device, where the request for acquiring the authentication information is sent after the service device receives an authentication request sent by a station STA.

If the service device receives the authentication request sent by the station STA, but the service device does not have the authentication information required by the service device to perform authentication with the STA, in order to establish a connection to the STA, the service device needs to send the request for acquiring the authentication information of the service device to the AP, and correspondingly, the AP needs to receive the request that is for acquiring the authentication information and that is sent by the service device.

S1402: The access point AP sends an authentication information response to the service device, where the authentication information response includes the authentication information that is required when the service device performs authentication, so that the service device performs authentication on the STA according to the authentication information.

After the AP sends, to the service device, the authentication information response that includes the authentication information that is required when the service device performs authentication, the corresponding service device receives the authentication information, and performs authentication with the STA.

In the foregoing solution, after receiving an authentication request of a STA, a service device needs to acquire, from an AP, only authentication information that is required when the service device performs authentication, and then authentication with the STA can be established, which makes an authentication process more flexible, and avoids failing to establish a connection and affecting use by a customer because the service device does not have authentication information that is required for the service device to perform authentication.

Figure 15:
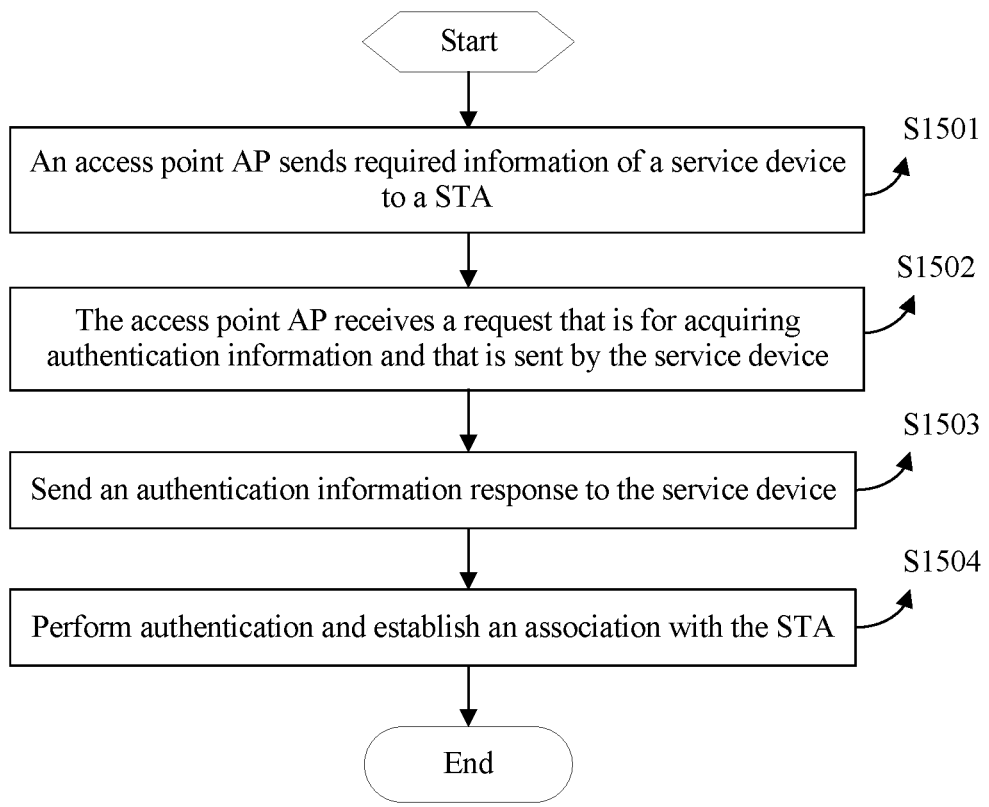
FIG. 15 is a flowchart of a second possible implementation manner of an authentication method according to this application.

Referring to FIG. 15, FIG. 15 is a flowchart of a second possible implementation manner of an authentication method according to this application. This implementation manner includes:

S1501: An access point AP sends information about a service device to a station STA. For example, after a guest enters a hotel, an access point AP of the hotel sends, to a mobile phone of the guest, information about a service device that can be used in the hotel, such as a printer, so as to provide a reference for the guest to determine whether there is a need to use the service device. If desired, the guest may directly send an authentication request to the service device by using the mobile phone.

S1502: The access point AP receives a request that is for acquiring authentication information and that is sent by the service device, where the request for acquiring the authentication information is sent after the service device receives an authentication request sent by the STA.

If the service device receives the authentication request sent by the station STA, but the service device does not have the authentication information required by the service device to perform authentication with the STA, in order to establish a connection to the STA, the service device needs to acquire the authentication information of the service device from the AP.

S1503: The access point AP sends an authentication information response to the service device, where the authentication information response includes the authentication information that is required when the service device performs authentication, so that the service device performs authentication on the STA according to the authentication information.

S1504: The access point AP performs authentication and establishes an association with the STA. Optionally, after sending, to the service device, the authentication information response that includes the authentication information that is required when the service device performs authentication, the access point AP may perform authentication and establish an association with the STA, which makes it convenient for the STA to establish a connection to another service device that has authentication information that is required when the service device performs authentication, where the establishing an association includes that the AP exchanges a name, an address, a rate, and a power of a device with the STA, and further includes that the STA completes registration on a distributed system DS.

In the foregoing solution, after receiving an authentication request of a STA, a service device needs to acquire, from an AP, only authentication information that is required when the service device performs authentication, and then authentication with the STA can be established, and further, an association with the STA can be established, which makes an authentication and association process more flexible, and avoids failing to establish a connection and affecting use by a customer because the service device does not have authentication information that is required for the service device to perform authentication.

Figure 16:
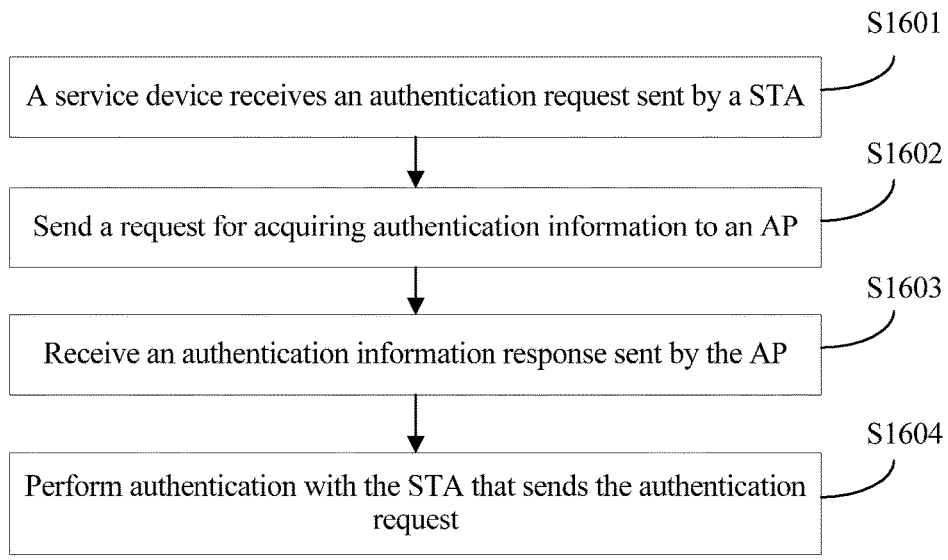
FIG. 16 is a flowchart of a third possible implementation manner of an authentication method according to this application.

Referring to FIG. 16, FIG. 16 is a flowchart of a third possible implementation manner of an authentication method according to this application. This implementation manner includes:

S1601: A service device receives an authentication request sent by a station STA.

After determining a service device to which the STA needs to connect, the STA needs to send the authentication request to the service device, and correspondingly, the service device receives the authentication request.

S1602: The service device sends a request for acquiring authentication information to an AP.

After the service device receives the foregoing authentication request, but the service device does not have the authentication information required by the service device to perform authentication with the STA, in order to establish a connection to the STA, the service device needs to acquire the authentication information of the service device from the AP.

S1603: The service device receives an authentication information response sent by the AP, where the authentication information response includes the authentication information that is required when the service device performs authentication.

S1604: The service device performs authentication with the STA that sends the authentication request. After acquiring, from the AP, the authentication information that is required during authentication, the service device may perform authentication with the STA.

Further, if the foregoing STA sends an association request to the service device, the service device receives the association request sent by the authenticated STA. The service device determines whether to agree to establish an association with the STA. If the service device agrees to establish an association with the STA, the service device replies an association response to the STA and establishes an association with the STA, where the establishing an association includes that the service device exchanges a name, an address, a rate, and a power of a device with the STA. If the service device disagrees to establish an association with the STA, the service device replies the STA with a reject message.

Optionally, before the service device establishes authentication and an association with the STA, the STA may also perform authentication and association with the AP.

In the foregoing solution, when a service device that does not have authentication information of its own receives an authentication request of a STA, the service device needs to acquire, from an AP, only the authentication information that is required when the service device performs authentication, and then authentication with the STA can be established, and further, an association with the STA can be established, and a connection to the STA is established, which makes an authentication and association process more flexible, and avoids failing to establish a connection and affecting use by a customer because the service device does not have authentication information that is required for the service device to perform authentication.

Figure 17:
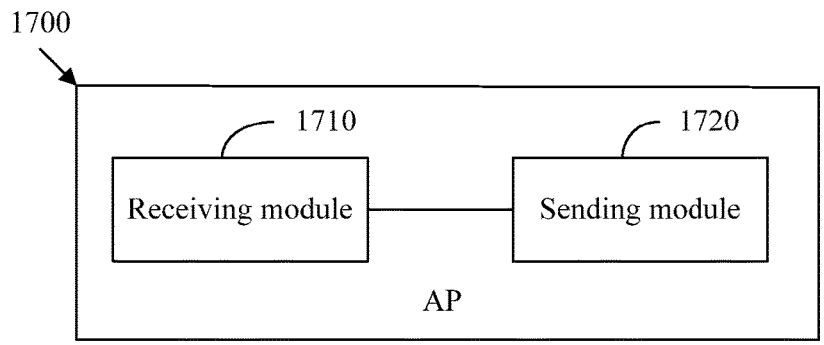
FIG. 17 is a schematic structural diagram of a fourth possible implementation manner of an access point AP according to this application.

Referring to FIG. 17, FIG. 17 is a schematic structural diagram of a fourth possible implementation manner of an access point AP according to this application. An access point AP 1700 in this implementation manner includes a receiving module 1710 and a sending module 1720.

The receiving module 1710 is configured to receive a request that is for acquiring authentication information and that is sent by a service device, where the request for acquiring the authentication information is sent after the service device receives an authentication request sent by a station STA.

If the service device receives the authentication request sent by the station STA, but the service device does not have the authentication information required by the service device to perform authentication with the STA, in order to establish a connection to the STA, the service device needs to send the request for acquiring the authentication information of the service device to the AP, and correspondingly, the receiving module 1710 needs to receive the request that is for acquiring the authentication information and that is sent by the service device.

The sending module 1720 is configured to send an authentication information response to the service device, where the authentication information response includes the authentication information that is required when the service device performs authentication, so that the service device performs authentication on the STA according to the authentication information.

After the AP sends, to the service device, the authentication information response that includes the authentication information that is required when the service device performs authentication, the corresponding service device receives the authentication information, and performs authentication with the STA.

Specifically, after the receiving module 1710 receives the request that is for acquiring the authentication information and that is sent by the service device, the sending module 1720 correspondingly sends the authentication information of the service device to the service device, so that the service device can receive the authentication information, and further establish an association with the STA.

Figure 18:
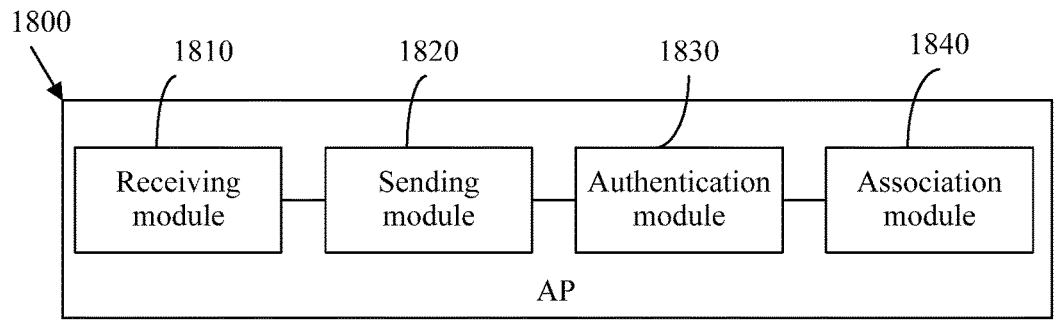
FIG. 18 is a schematic structural diagram of a fifth possible implementation manner of an access point AP according to this application.

Further, referring to FIG. 18, FIG. 18 is a schematic structural diagram of a fifth possible implementation manner of an access point AP according to this application. An AP 1800 in this implementation manner includes a receiving module 1810 and a sending module 1820, and further includes an authentication module 1830 and an association module 1840.

The receiving module 1810 is configured to receive a request that is for acquiring authentication information and that is sent by a service device, where the request for acquiring the authentication information is sent after the service device receives an authentication request sent by a station STA.

If the service device receives the authentication request sent by the station STA, but the service device does not have the authentication information required by the service device to perform authentication with the STA, in order to establish a connection to the STA, the service device needs to send the request for acquiring the authentication information of the service device to the AP, and correspondingly, the receiving module 1810 needs to receive the request that is for acquiring the authentication information and that is sent by the service device.

The sending module 1820 is configured to send an authentication information response to the service device, where the authentication information response includes the authentication information that is required when the service device performs authentication.

The authentication module 1830 is configured to perform authentication with the STA when the service device receives the authentication information and performs authentication with the STA.

The association module 1840 is configured to establish an association with the STA after the STA and the service device complete authentication, where the establishing an association includes exchanging a name, an address, a rate, and a power of a device, and further includes that the STA completes registration on a distributed system DS.

It should be added that before the receiving module 1810 receives the request that is for acquiring the authentication information and that is sent by the service device, the sending module 1820 is further configured to send a message of the service device to the STA that joins a network. For example, after a guest enters a hotel, an access point AP of the hotel sends, to a mobile phone of the guest, information about a service device that can be used in the hotel, such as a printer, so as to provide a reference for the guest to determine whether there is a need to use the service device. If desired, the guest may directly send an authentication request to the service device by using the mobile phone.

Specifically, the sending module 1820 of the access point AP 1800 sends a message of a service device inside a network to a STA that enters the network, for the STA to select if there is a needed service device; after the STA selects a service device and sends an authentication request to the service device and the corresponding service device receives the foregoing authentication request, the receiving module 1810 receives a request that is for acquiring authentication information and that is sent by the service device, and then the sending module 1820 sends the authentication information of the foregoing service device to the service device, so that the service device performs authentication and establishes an association with the STA that sends the authentication request; before the service device establishes an association with the STA, the authentication module 1830 may also exchange authentication information with the STA and establishes authentication; correspondingly, when the service device establishes an association with the STA, the association module 1840 may also establish an association with the STA, which makes it convenient for the STA to establish a connection to another service device that has authentication information that is required when the service device performs authentication.

In the foregoing solution, when a service device that does not have authentication information of its own receives an authentication request of a STA, the service device needs to acquire, from an AP, only the authentication information that is required when the service device performs authentication, and then authentication with the STA can be established, and further, an association with the STA can be established, which makes an authentication and association process more flexible, and avoids failing to establish a connection and affecting use by a customer because the service device does not have authentication information that is required for the service device to perform authentication.

Figure 19:
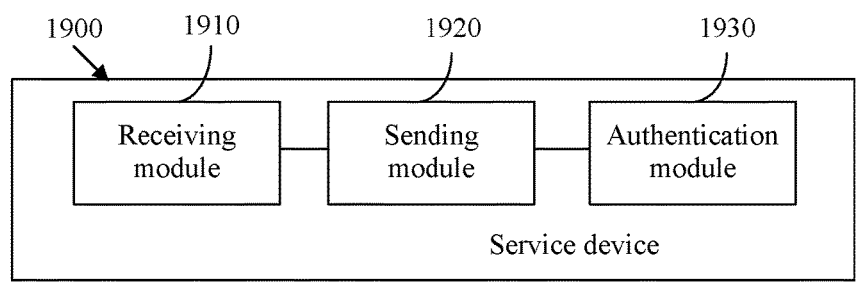
FIG. 19 is a schematic structural diagram of a third possible implementation manner of a service device according to this application.

Referring to FIG. 19, FIG. 19 is a schematic structural diagram of a third possible implementation manner of a service device according to this application. A service device 1900 in this implementation manner includes a receiving module 1910, a sending module 1920, and an authentication module 1930. The receiving module 1910 is configured to receive an authentication request sent by a station STA. The sending module 1920 is configured to send a request for acquiring authentication information to an AP. The receiving module 1910 is further configured to receive an authentication information response sent by the AP, where the authentication information response includes the authentication information that is required when the service device performs authentication. The authentication module 1930 is configured to perform authentication with the STA.

Figure 20:
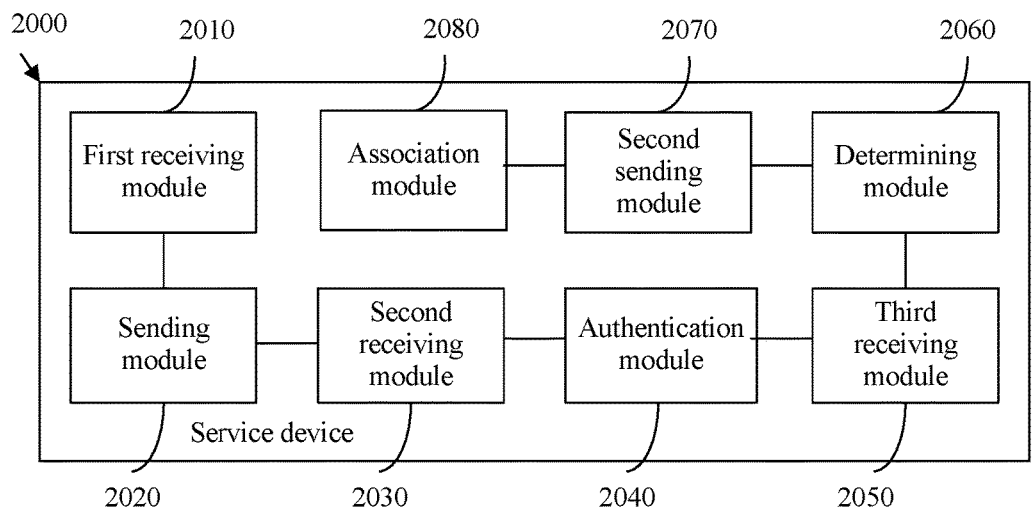
FIG. 20 is a schematic structural diagram of a third possible implementation manner of a service device according to this application.

To describe a working process of each module in this implementation manner more clearly, refer to FIG. 20. FIG. 20 is a schematic structural diagram of a third possible implementation manner of a service device according to this application. It should be understood that a service device in FIG. 20 provides further detailed description of the service device in FIG. 19. The service device in this implementation manner includes a first receiving module 2010, a sending module 2020, a second receiving module 2030, an authentication module 2040, and a third receiving module 2050, and further includes a determining module 2060, a second sending module 2070, and an association module 2080.

The first receiving module 2010 is configured to receive an authentication request sent by a station STA.

After determining a service device to which the STA needs to connect, the STA needs to send the authentication request to the service device, and correspondingly, the first receiving module 2010 of the service device receives the authentication request.

The sending module 2020 is configured to send a request for acquiring authentication information to an AP.

After the service device receives the foregoing authentication request, but the service device does not have the authentication information required by the service device to perform authentication with the STA, in order to establish a connection to the STA, the service device needs to acquire the authentication information of the service device from the AP by using the sending module 2020.

The second receiving module 2030 is configured to receive an authentication information response sent by the AP, where the authentication information response includes the authentication information that is required when the service device performs authentication.

The authentication module 2040 performs authentication with the STA.

After acquiring, from the AP, the authentication information that is required during authentication, the service device performs authentication with the STA.

To establish a connection to the service device, after the authentication is completed, the STA further needs to establish an association with the service device; therefore, the STA needs to send an association request to the service device, and correspondingly, the third receiving module 2050 of the service device needs to receive the association request.

The determining module 2060 is configured to determine whether to agree to establish an association with the STA.

The second sending module 2070 is configured to reply an association response to the STA. If the determining module 2060 agrees to establish an association with the STA, the association module 2080 establishes an association with the STA; or if the determining module 2060 disagrees to establish an association with the STA, the second sending module 2070 is configured to send a reject message to the STA, where the establishing an association includes that the service device exchanges a name, an address, a rate, and a power of a device with the STA.

Specifically, after the first receiving module 2010 of the service device 2000 receives an authentication request sent by a STA, in order to establish authentication with the STA, the service device 2000 sends, by using a sending module 2020, a request for acquiring authentication information to an AP, receives, by using the second receiving module 2030, the authentication information sent by the AP, and exchanges authentication information and performs authentication with the STA by using the authentication module 2040. To further establish a connection to the service device, after the authentication with the STA is completed, the third receiving module 2050 may receive an association request sent by the STA, and in this case, the determining module 2060 determines whether to agree to establish an association with the STA, and then the second sending module 2070 replies an association response to the STA; if the determining module 2060 agrees to establish an association with the STA, the service device 2000 establishes an association with the STA by using the association module 2080; or if the determining module 2060 disagrees to establish an association with the STA, the second sending module 2070 sends a reject message to the STA.

In the foregoing solution, when a service device that does not have authentication information of its own receives an authentication request of a STA, the service device needs to acquire, from an AP, only the authentication information that is required when the service device performs authentication, and then authentication with the STA can be established, and further, an association with the STA can be established, which makes an authentication and association process more flexible and convenient, and avoids failing to establish a connection and affecting use by a customer because the service device does not have authentication information that is required for the service device to perform authentication.

Figure 21:
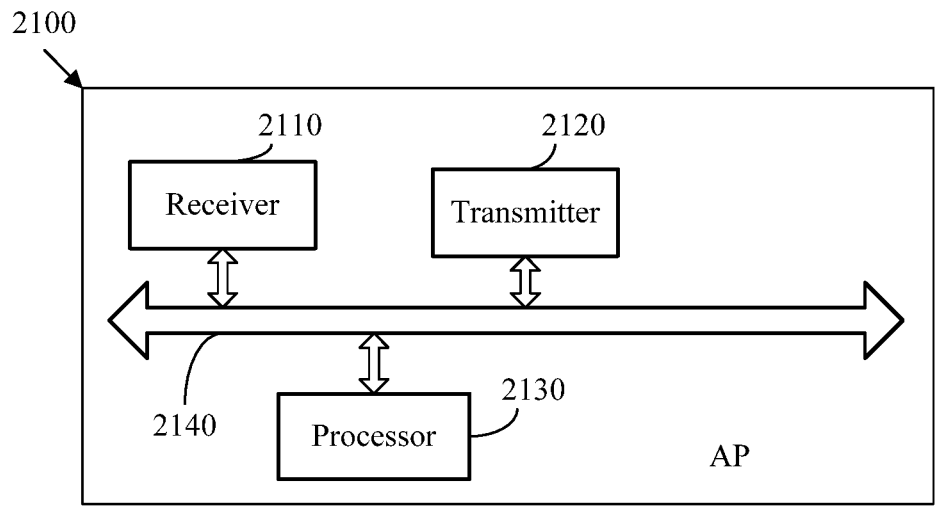
FIG. 21 is a schematic structural diagram of an apparatus of a second possible implementation manner of an access point AP according to this application.

Referring to FIG. 21, FIG. 21 is a schematic structural diagram of an apparatus of a second possible implementation manner of an access point AP according to this application. An AP in this implementation manner includes a receiver 2110 and a transmitter 2120.

The receiver 2110 is configured to receive a request that is for acquiring authentication information and that is sent by a service device, where the request for acquiring the authentication information is sent after the service device receives an authentication request sent by a station STA.

If the service device receives the authentication request sent by the station STA, but the service device does not have the authentication information required by the service device to perform authentication with the STA, in order to establish a connection to the STA, the service device needs to send the request for acquiring the authentication information of the service device to the AP, and correspondingly, the receiver 2110 needs to receive the request that is for acquiring the authentication information and that is sent by the service device.

The transmitter 2120 is configured to send an authentication information response to the service device, where the authentication information response includes the authentication information that is required when the service device performs authentication, so that the service device performs authentication on the STA according to the authentication information.

After the transmitter 2120 sends, to the service device, the authentication information response that includes the authentication information that is required when the service device performs authentication, the corresponding service device receives the authentication information, and performs authentication with the STA.

Specifically, after the receiver 2110 receives the request that is for acquiring the authentication information and that is sent by the service device, the transmitter 2120 correspondingly sends the authentication information of the service device to the service device, so that the service device receives the authentication information, and further establishes an association with the STA.

Further, referring to FIG. 21, the AP in this implementation manner further includes a processor 2130. The processor 2130 is configured to perform authentication and establish an association with the STA, where the establishing an association includes exchanging a name, an address, a rate, and a power of a device with the STA, and further includes that the STA completes registration on a distributed system DS. All components of the AP 2100 are coupled together by using a bus 2140, where the bus 2140 includes a data bus, and may further include a power bus, a control bus, a status signal bus, and the like. However, for clarity of description, various buses are marked as the bus 2140 in the figure.

It should be added that before the receiver 2110 receives the request that is for acquiring the authentication information and that is sent by the service device, the transmitter 2120 is further configured to send a message of the service device to the STA that joins a network. For example, after a guest enters a hotel, an access point AP of the hotel sends, to a mobile phone of the guest, information about a service device that can be used in the hotel, such as a printer, so as to provide a reference for the guest to determine whether there is a need to use the service device. If desired, the guest may directly send an authentication request to the service device by using the mobile phone.

Specifically, the transmitter 2120 of the access point AP 2100 sends a message of a service device inside a network to a STA that enters the network, for the STA to select if there is a needed service device; after the STA selects a service device and sends an authentication request to the service device and the corresponding service device receives the foregoing authentication request, the receiver 2110 receives a request that is for acquiring authentication information and that is sent by the service device, and then the transmitter 2120 sends the authentication information of the foregoing service device to the service device, so that the service device performs authentication and establishes an association with the STA that sends the authentication request; before the service device establishes an association with the STA, the processor 2130 may also exchange authentication information with the STA and establishes authentication; correspondingly, before the service device establishes an association with the STA, the processor 2130 may also establish an association with the STA, which makes it convenient for the STA to establish a connection to another service device that has authentication information that is required when the service device performs authentication.

In the foregoing solution, when a service device that does not have authentication information of its own receives an authentication request of a STA, the service device needs to acquire, from an AP, only the authentication information that is required when the service device performs authentication, and then authentication with the STA can be established, and further, an association with the STA can be established, which makes an authentication and association process more flexible and convenient, and avoids failing to establish a connection and affecting use by a customer because the service device does not have authentication information that is required for the service device to perform authentication.

Figure 22:
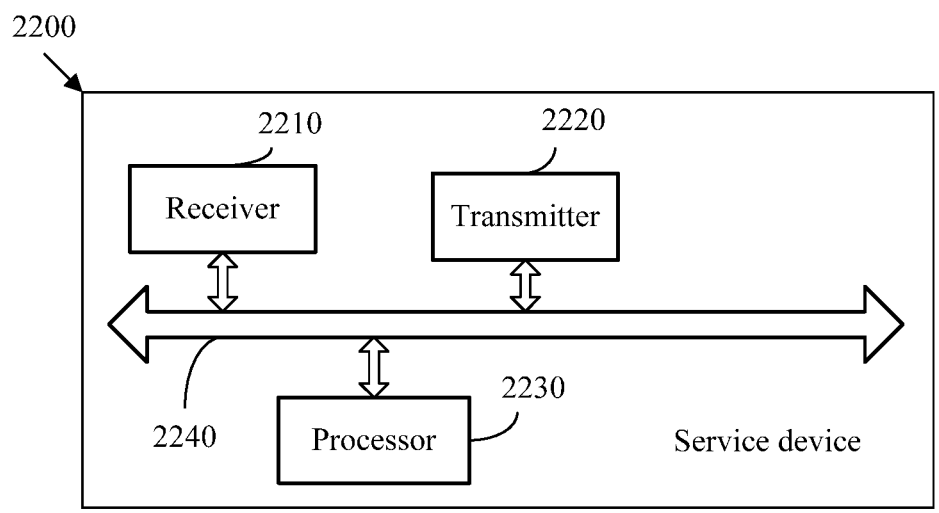
FIG. 22 is a schematic structural diagram of an apparatus of a second possible implementation manner of a service device according to this application.

Referring to FIG. 22, FIG. 22 is a schematic structural diagram of an apparatus of a second possible implementation manner of a service device according to this application. A service device 2200 in this implementation manner includes a receiver 2210, a transmitter 2220, and a processor 2230. All components of the service device 2200 are coupled together by using a bus 2240, where the bus 2240 includes a data bus, and may further include a power bus, a control bus, a status signal bus, and the like. However, for clarity of description, various buses are marked as the bus 2240 in the figure.

The receiver 2210 is configured to receive an authentication request sent by a station STA.

After determining a service device to which the STA needs to connect, the STA needs to send the authentication request to the service device, and correspondingly, the receiver 2210 of the service device receives the authentication request.

The transmitter 2220 is configured to send a request for acquiring authentication information to an AP.

After the receiver 2210 receives the foregoing authentication request, but the service device does not have the authentication information required by the service device to perform authentication with the STA, in order to establish a connection to the STA, the service device needs to acquire the authentication information of the service device from the AP by using the transmitter 2220.

The receiver 2210 is further configured to receive an authentication information response sent by the AP, where the authentication information response includes the authentication information that is required when the service device performs authentication.

The processor 2230 is configured to perform authentication on the STA. After acquiring, from the AP, the authentication information that is required during authentication, the service device performs authentication with the STA.

To establish a connection to the service device, after the authentication is completed, the STA further needs to establish an association with the service device; therefore, the STA needs to send an association request to the service device. As a result, the receiver 2210 is further configured to receive the association request sent by the authenticated STA.

The processor 2230 is further configured to determine whether the service device agrees to establish an association with the STA.

If the processor 2230 agrees to establish an association with the STA, the processor establishes an association with the STA. If the processor 2230 disagrees to establish an association with the STA, the transmitter 2220 sends a reject message to the STA, where the establishing an association includes that the service device exchanges a name, an address, a rate, and a power of a device with the STA.

Specifically, after the receiver 2210 of the service device 2200 receives an authentication request sent by a STA, in order to establish authentication with the STA, the service device 2200 sends, by using the transmitter 2220, a request for acquiring authentication information to an AP, and receives, by using the receiver 2210, the authentication information sent by the AP; and the processor 2230 exchanges authentication information with the STA and performs authentication. To further establish a connection to the service device 2200, after the authentication with the STA is completed, the receiver 2210 may receive an association request sent by the STA, and in this case, the processor 2230 determines whether to agree to establish an association with the STA; if the processor 2230 agrees to establish an association with the STA, the processor 2230 establishes an association with the STA; or if the processor disagrees to establish an association with the STA, the transmitter 2220 sends a reject message to the STA.

In the foregoing solution, when a service device that does not have authentication information of its own receives an authentication request of a STA, the service device needs to acquire, from an AP, only the authentication information that is required when the service device performs authentication, and then authentication with the STA can be established, which makes an authentication and association process more flexible and convenient, and avoids inconvenience caused because the service device does not have authentication information that is required when the service device performs authentication.

In the several implementation manners provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the implementation manners.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor (processor) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. An authentication and association method through an access point (AP), comprising:
   receiving, by the AP, an authentication result query request sent by a service device that has received an association request sent from a station (STA) to be associated with the service device,
   wherein the authentication result query request is used by the AP to query whether the STA that sent the association request to the service device is authenticated by the AP;
   in response to the received authentication result query request, querying, by the AP, whether the STA is authenticated by the AP; and
   in response to the querying, sending, by the AP, a result of the authentication result query request to the service device, so that the service device determines whether the STA is authenticated by the AP according to the result of the authentication result query request, to establish an association with the STA.

2. The method according to claim 1, wherein:
   before the receiving, by the AP, the authentication result query request sent by the service device, the method comprises: performing, by the AP, authentication with the station (STA).

3. An authentication and association method, comprising:
   receiving, by a service device, an association request for an association sent by a station (STA);
   sending, by the service device, an authentication result query request to an access point (AP), wherein the authentication result query request is used by the AP to query whether the STA that sends the association request to the service device is authenticated by the AP; and
   receiving, by the service device, a result of the authentication result query request sent by the AP, and determining, according to the result of the authentication result query request, whether to establish the association with the STA.

4. The method according to claim 3, wherein if the STA is authenticated by the AP, the service device establishes an association with the STA; or if the STA fails to be authenticated by the AP, the service device refuses to establish an association with the STA.

5. An access point (AP), comprising:
   a receiver,
   a processor, and
   a transmitter,
   wherein,
   the receiver is configured to receive an authentication result query request sent by a service device that has received an association request sent from a station (STA) to be associated with the service device,
   the authentication result query request is-used to query whether the STA that sent the association request to the service device is authenticated by the AP;
   the processor is configured to execute the query whether the STA is authenticated by the AP; and
   the transmitter is configured to send a result of the authentication result query request to the service device, so that the service device determines whether the STA is authenticated by the AP, according to the result of the authentication result query request, to establish an association with the STA.

6. The AP according to claim 5, wherein:
   the processor is further configured to perform authentication with the STA and the service device.

7. A service device, comprising:
   a receiver,
   a transmitter, and
   a processor,
   wherein
   the receiver is configured to receive an association request for an association sent by a station (STA);
   the transmitter is configured to send an authentication result query request to an access point (AP), wherein the authentication result query request is used by the AP to query whether the STA that sends the association request to the service device is authenticated by the AP; and
   the receiver is further configured to receive a result of the authentication result query request sent by the AP, and determine, according to the result of the authentication result query request, whether to establish the association with the station.

8. The service device according to claim 7, wherein if the STA is authenticated by the AP, the processor is configured to establish an association with the STA; or
   if the STA fails to be authenticated by the AP, the processor is configured to refuse to establish an association with the STA.

* * * * *

UNITED STATES PATENT AND TRADEMARK OFFICE
CERTIFICATE OF CORRECTION

PATENT NO. : 10,187,796 B2
APPLICATION NO. : 15/205333
DATED : January 22, 2019
INVENTOR(S) : Xun Yang et al.

Page 1 of 1

It is certified that error appears in the above-identified patent and that said Letters Patent is hereby corrected as shown below:

In the Claims

Column 28, Line 29, Claim 5, delete "is-used" and insert --used--, therefor.

Signed and Sealed this
Twenty-fourth Day of September, 2019

Andrei Iancu
*Director of the United States Patent and Trademark Office*